Nov. 7, 1950 H. G. CISIN 2,528,636

RADIO RECEIVER OPERABLE FOR EITHER RADIO RECEPTION OR TELEPHONE AMPLIFICATION

Filed April 7, 1947

INVENTOR.
Harry G. Cisin
BY Philip S. W... Atty.

Patented Nov. 7, 1950 2,528,636

UNITED STATES PATENT OFFICE 2,528,636

RADIO RECEIVER OPERABLE FOR EITHER RADIO RECEPTION OR TELEPHONE AMPLIFICATION

Harry G. Cisin, Brooklyn, N. Y.

Application April 7, 1947, Serial No. 739,878

13 Claims. (Cl. 179—2)

The invention relates to a telephone auxiliary with particular reference to apparatus for amplifying telephone conversations both incoming and outgoing. This auxiliary may be so constructed that when not in use as a telephone amplifying device, it will function as a radio receiver.

One object of my invention is to provide a radio receiver capable of performing a dual function; i. e., first that of bringing in the usual broadcast station signals on its loud speaker in the customary manner, and second that of automatically discontinuing radio reception and converting to a telephone amplifying device without the necessity of making any physical connection to the telephone wiring system.

Another object of my invention is to provide means whereby a telephone conversation may be carried on without the necessity of holding the telephone instrument.

Another object of this invention is to provide means whereby a number of persons in a room may engage in a conference telephone conversation using only the single telephone instrument.

Another object of the invention is to provide means for louder reception of incoming telephone calls, to aid hard-of-hearing persons in using the telephone.

Another object of my invention is to provide means for improving the quality of telephone reception of a public telephone system without making connection to the telephone lines or instruments by filtering out unwanted frequencies or attenuating those frequencies which cause distortion.

Another object of my invention is to provide means for the rapid, convenient and automatic elimination of a radio program being received when the telephone rings; the rapid, convenient and automatic substitution of the telephone amplifying unit of the device and the rapid, convenient and automatic restoration of the interrupted radio program upon completion of the telephone call.

Another object of this invention is to provide a means for the reception of a telephone conversation at a distant point without the necessity of making physical connection to the telephone lines.

Another object of my invention is to provide means for preventing mutual interference and feed-back between the receiving and the transmitting units of the telephone amplifying system.

Another object of my invention is to couple inductively the receiver or earphone of a telephone instrument of a public telephone system with an audio amplifier capable of ample loud speaker volume and simultaneously to couple acoustically the transmitter or microphone of the same telephone instrument to a horn suitably designed to collect sound waves and concentrate them at the mouthpiece of the telephone instrument.

Another object of the invention is to couple inductively the receiver or earphone of the handset telephone of a public telephone system with an audio amplifier or with the audio amplifier section of a radio set.

Another object of the invention is to provide means for inductively coupling an earphone, a microphone, an electric phonograph pickup, a recorder or any other auxiliary device capable of producing, controlling or utilizing audio frequency current to an audio amplifier or to the audio amplifier section of a radio receiver in order to facilitate the use of such auxiliary apparatus by eliminating the need for physical metallic connections to the audio frequency amplifier.

Another object of the invention is to provide a means for amplifying indirectly the transmitter currents in a telephone instrument through the use of an audio frequency amplifier inductively coupled to the receiver or earphone of the same instrument.

Another object of my invention is to provide automatic means for registering the number of incoming and outgoing telephone calls made on a telephone instrument of a public telephone system and of registering time elapsed during each such call, without the necessity of making any physical connection to the telephone lines or instruments of the public telephone system.

Another object of my invention is to provide a simple, efficient means for temporarily interrupting the reception of a radio program without switching off the power.

A further object of this invention is to couple inductively the telephone receiver or earphone of a telephone instrument of a public telephone system with the audio amplifier of a radio receiver and simultaneously to couple acoustically the transmitter of the same telephone instrument with a horn suitably designed to collect sound waves and concentrate them at the mouthpiece of the telephone instrument.

A further object of this invention is to provide means for inductively coupling the telephone instrument or any other part of a public telephone system with the lines of a private intercommunication telephone system.

Another object of my invention is to provide means whereby a telephone conversation may be carried on over a private telephone intercommunication system without the necessity of holding the telephone instrument and whereby the customary "talk-listen" switch is unnecessary.

A feature of the invention is its simplicity of construction and small number of parts, resulting in low cost of manufacture and long life operation.

Another feature of the invention is its convenience and ease of operation, permitting it to be used by anyone, without instruction or practice.

Another feature of the invention is the ease with which it may be adapted to existing radio receivers by the addition of a few simple parts.

In general my invention comprises a telephone auxiliary consisting of a device for amplifying telephone conversations both incoming and outgoing, without making a direct or metallic connection between the public telephone lines or instruments and the auxiliary amplifying device.

In one form of the invention, the device performs a dual function, operating interchangeably as a radio receiver or a telephone amplifying unit. It may be converted from its radio reception function, merely by removing the telephone handset from its regular cradle and placing it in a predetermined position on the device. Removing the handset from the device, automatically returns the device to its radio reception function.

In another form of the invention, the device performs a number of other functions in addition to those of radio receiver and telephone amplifying unit. Since it incorporates a pickup coil conveniently connectible to the audio amplifying section of the radio set, this makes the device adaptable to perform various other useful functions. By connecting a suitable coupling coil to a microphone, a phonograph pickup or any other auxiliary equipment for producing or using audio frequency currents and by placing this coupling coil in inductive relationship to the pickup coil, it is possible to utilize the audio amplifier section of the radio set without the necessity of making any direct connection between the amplifier of the set and the auxiliary equipment. Thus the same device serves as a radio receiver, a telephone amplifier, a public address amplifier or call system, a phonograph amplifier and for many other purposes. By locating a second coil in the output of the audio amplifier section of the radio set so that it may be switched into the circuit interchangeably with the loud speaker, the device may be made to function as a recorder, merely by adding a suitable coupling coil to the input of the recorder and then placing this coil in inductive relationship to the output coil of the device. The device will now function to record radio programs, both incoming and outgoing telephone conversations and speech or music picked up by a local microphone and it will do all these things without the necessity of actually connecting the recorder or the microphone or the other auxiliaries to the device itself.

In another form of the invention, the device functions solely as a telephone amplifying unit. In this arrangement, the telephone receiver or earphone of the telephone instrument or any other suitable inductance winding of a public telephone system is electromagnetically or inductively coupled to an audio amplifier capable of ample loud speaker volume and simultaneously the transmitter of the same telephone instrument is acoustically coupled to an acoustical system such as a properly designed horn for collecting the sound waves and focusing them at the mouthpiece of the telephone instrument. This form of the invention is especially adapted for business purposes where it may be desirable to have both hands free while telephoning or where a group of people may wish to participate in a conference telephone call. In the latter case, the device may be set at the center of the conference table and the group gathered around the table will be able to hear the incoming telephone conversation clearly and each person at the table will be able to participate in the telephone discussion, without the necessity of talking directly into the mouthpiece of the telephone transmitter.

In another form of the invention, additional loud speakers may be actuated at distant points by the incoming telephone calls, merely by connecting the extra speakers with the loud speaker of the audio amplifier.

In still another form of the invention, the method of inductive coupling may be used to provide a means for a private intercommunication system which can be operated without the necessity of a "talk-listen" switch.

My invention additionally comprises the novel details of construction and arrangement of components which in their preferred embodiment only are illustrated in the accompanying drawings and which are hereinafter more fully described and their essential characteristics pointed out in the accompanying claims.

According to the drawing—

Similar reference numerals refer to similar parts throughout the drawing.

Figure 1:
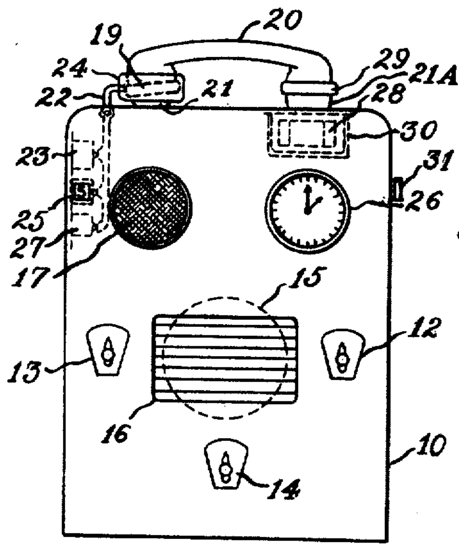
Fig. 1 is a plan view of one form of the invention showing a handset of a public telephone system resting on top of the cabinet.
Figure 2:
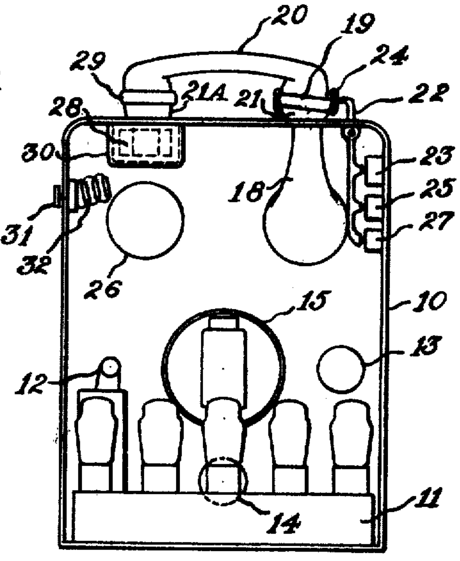
Fig. 2 is a rear view of the same device with the back of the cabinet removed.

In the embodiment of my invention illustrated, I show the device provided with a cabinet 10, in which is mounted a radio receiver 11, having a station selector knob 12 and a combined "on-off" switch-volume control knob 13 and a tone control knob 14. The radio loud speaker 15 is mounted behind grille 16. A grille 17, preferably of cloth, covers the inlet of the acoustic horn 18 which conveys sound to mouthpiece 19 of telephone handset 20. The mouthpiece rests in a receptacle 21, preferably close-fitting and flexible, which may form one end of acoustic horn 18. As handset 20 is inserted in its receptacles, it depresses a lever 22, closing micro-switch 23. A ring of flexible material 24 encloses the end of mouthpiece 19 and of receptacle 21, to keep sounds from entering at this point, except from horn 18. A counter 25, which may be of the Veeder type, furnishes a record of the number of telephone calls handled. A timing device 26, which may be a form of electric clock, controlled by an automatic switch 27, furnishes a check on the elapsed time of each telephone call. A pickup inductance coil 28, having its impedance matched to the circuit to which it is connected, is mounted directly below receptacle 21—A into which earphone 29 fits snugly. The coil is surrounded at all points except the top by a shield 30, preferably of iron, which is grounded. Receptacles 21 and 21—A may be combined into a single receptacle, but must be arranged so that handset 20 can only be placed in the predetermined correct operative position. A manually-operated switch 31 provides means for shunting coil 28 with feed-back control condensers 32. The outlet of horn 18 is of smaller diameter than its inlet, the horn being designed according to well-known acoustic principles so as to magnify sounds entering it.

To operate, the device is placed near the telephone instrument and connected to a source of electricity. Switch 13 is turned "on" and a radio program is tuned in with the station selector knob 12. The device then functions as a radio set. When the telephone rings or it is wished to make an outgoing call, handset 20 is placed on top of cabinet 10, with mouthpiece 19 in receptacle 21 and with earphone 20 in receptacle 21—A. This action depresses lever 22, actuating switch 23, thus causing switch to disconnect the pre-audio section of the radio set from its audio section and instead to connect coil 28 to the audio section. Radio reception immediately stops and the voice of the person at the other end of the telephone line can be heard coming from the loud speaker 15, because the pickup coil 28 is inductively coupled to the earphone 29. In this manner, the audio frequency current from the earphone 29 is transferred to pickup coil 28 and is amplified by the audio system of radio receiver 11. When lever 22 is depressed, it also actuates the counter 25 and at the same time closes switch 27, which permits a flow of current to the electric timing mechanism 26, causing this to record or register elapsed time from the start of the telephone call to its completion.

With the handset 20 in position on top of cabinet 10, the person at the other end of the telephone line will be able to hear the voices of anyone speaking in the vicinity of the device. It has been found that the voices of persons in the room with the device, are amplified to a certain extent by the action of the pickup coil 28 and the audio amplifier of the radio set 11, thus adding to the clarity of reception at the other end of the telephone line. Thus in effect, the outgoing call is amplified in two ways. First, through the use of horn 18 which acts as a sound collector and magnifier in a manner analogous to an ear trumpet. Second, in an indirect way as follows. The sound gathered by the horn 18 impinges on the microphone below the mouthpiece 19 of the telephone handset 20 and the resulting audio currents pass through the telephone earphone 29 which is in the same circuit with the microphone. These currents are inductively transmitted to the audio amplifier of the radio receiver 11 by means of the pickup coil 28 and the amplified sound of the speaker's voice comes out of the loud speaker 15. This is not apparent to the person talking into the device because the sounds from the loud speaker are in phase with his direct speech. However, the sounds from the loud speaker are carried back to the telephone transmitter by means of horn 18, thus regenerating and building up the original sounds and providing enough amplification to permit the speaker's voice to be heard at the other end of the telephone line, without the necessity of talking directly into the mouthpiece 19 of telephone handset 20.

In order to eliminate undesirable feedback, the conventional methods of mounting the mouth of horn 18 and the face of speaker 15 in the same plane are used, together with other obvious expedients, but these of themselves are not in every case sufficient to prevent feedback. In order to furnish a control to accomplish this desirable purpose, a switch 31 is provided whereby fixed condensers 32 of suitable values are shunted across the pickup coil 28. The values of these condensers are selected so as to by-pass frequencies above a certain limit so that these higher frequencies will not be amplified by the audio amplifier. By changing the position of switch 31 from one point to another, larger capacity condensers are shunted around the pickup coil 28, thus lowering the effective frequency range of the amplifier. This method provides an effective means of limiting the building up of feedback, sinces the higher frequencies which tend to spiral into the characteristic feedback whistles and squeals are prevented from doing this, since they are by-passed or greatly attenuated before they reach the amplifier. Through the proper selection of constants of the pickup coil and condenser, an efficient low-pass wave filter is obtained which transmits all frequencies up to the desired frequency and attenuates all higher frequencies. The pickup coil may also be combined with other impedances to form a bandpass filter at the input of the amplifier. This will transmit all frequencies between a desired lower and a desired upper frequency, attenuating all other frequencies. In this way, the device will function to eliminate 60 cycle hum and other undesirable low frequency sounds as well as all undesired higher frequencies. As a result, the quality of the incoming telephone call as received on the loud speaker 15 of the device, may be greatly improved over that received directly from the earphone 29 of the public telephone instrument.

Hitherto, there has been no device available to the user of the public telephone to improve the quality of reception and apparently no effort has been made to improve reception of the standard telephone receivers by the application of modern electronic principles. When unfamiliar names or words are used in a telephone conversation, it is still necessary to spell out each word and to couple each letter with a familiar sounding name so that the listener will be able to determine just what is being said. The present invention provides a means for improving telephone reception which is readily available to every telephone user and without the necessity of making any connection to the telephone lines or instruments. In addition to the use of a filter at the input to the audio amplifier, the tone control 14 may also be used to improve the tone quality of the incoming telephone conversation. With a well designed tone control, results are quite effective. The volume of the incoming telephone call may be controlled by means of the volume control knob 13. The volume control is located at the input of the audio amplifier of radio set 11.

An additional means of preventing feed-back is the grounded shield 30 which surrounds pickup coil 28 at all points except on top, where the coil is inductively coupled to earphone 29 or to some other inductance coil. This shielding is especially effective in preventing interaction between pickup coil 28 and loud speaker 15.

When the telephone conversation has been completed, handset 20 is removed from the top of cabinet 10 and returned to its regular cradle. This instantly releases lever 22, permitting micro switch 23 to return to its normal position, thus connecting the pre-audio section of the radio set 11 to the audio frequency amplifier. Consequently, the signal from the radio broadcast station which was being received at the time of the interruption due to the telephone call, is again heard coming from the loud speaker 15. As lever 22 is released, the plunger on counter 25 returns to its normal position so that it is again ready to record the next telephone call. The release of lever 22 also opens switch 27, interrupting the flow of current to electric timer 26, thus enabling the timer to show the elapsed time between the start and the finish of the telephone call.

Figure 3:
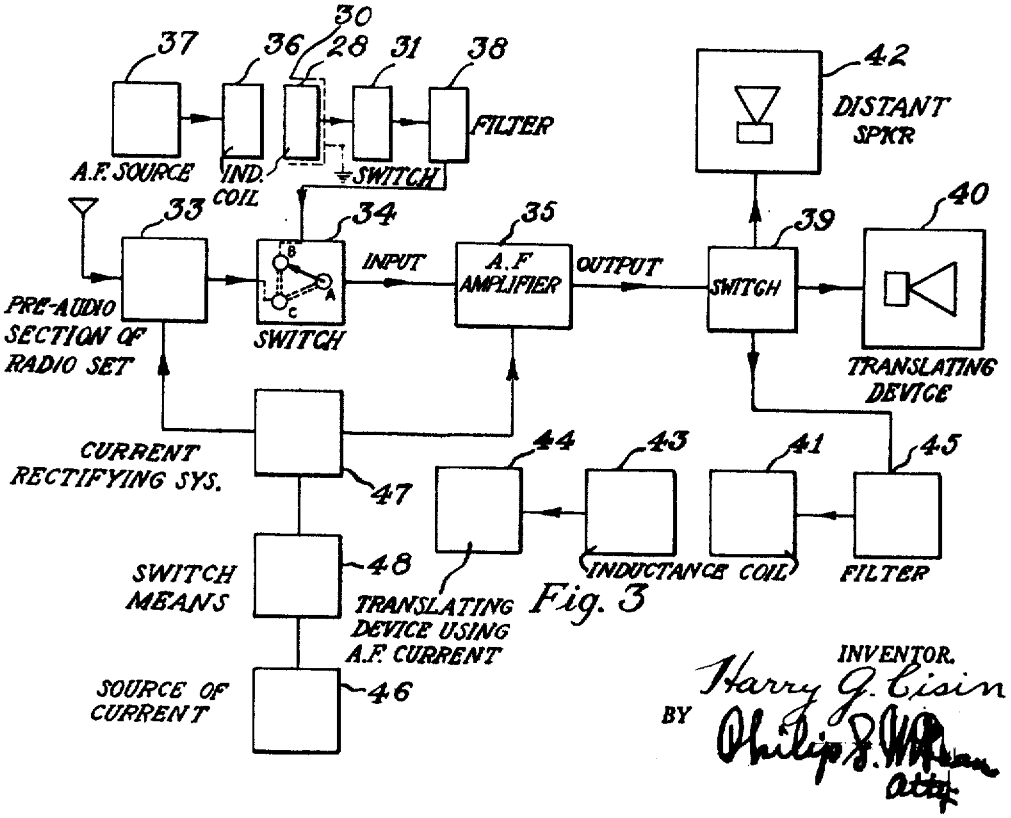
Fig. 3 is a block wiring diagram of the invention.

In the block diagram of the invention, shown in Fig. 3, the radio set shown may be of any conventional commercial type employing any standard circuit such as a super-heterodyne circuit or a tuned radio frequency circuit; it may be an amplitude modulated or a frequency modulated set. Regardless of the circuit employed, all radio receivers may be considered as being divisible into two main sections, viz: a "pre-audio section" and an audio frequency amplifier section.

The words "pre-audio section" as herein used, mean all stages of the radio receiver preceding the audio frequency amplifier. The words "translating device" as herein used, mean any device utilizing audio frequency current for conversion to sound, mechanical movement, light, heat or any other form or manifestation of energy.

Fig. 3 shows an antenna connected to the input of the pre-audio section 33 of a radio set, and switch 34 connected between the output of the pre-audio section 33 and the input to the audio frequency amplifier 35, in a manner such that inductance or pickup coil 28 may be substituted for the pre-audio section 33 of the radio set or vice versa, by the movement of the arm of switch 34 from one of its operating positions to the other. This switch is normally held in position so that point A is connected to point C. It is held in this position by the action of a spring. The weight of the telephone handset or any other slight pressure counteracts the tension of the spring thus disconnecting point A from C and connecting point A to point B instead. This substitutes the pickup coil 28 at the input to the audio frequency amplifier 35, in place of the pre-audio section 33 of the radio set.

The double dotted lines between points A, B and C of switch 34 indicate jumpers for shorting out the switch, as the inductance coil 28 may be connected in the same circuit with the output of the pre-audio section of the radio set, without employing a switching arrangement. In this case, it is necessary to eliminate the incoming radio broadcast signal by turning the station selector knob 12 to some point on the dial which will tune out local broadcasting, whenever inductance coil 28 is to be used for telephone amplification or for introducing into the audio frequency amplifier of the radio set, locally generated audio frequency current.

Placed in inductive proximity to coil 28, is a second movable inductance coil 36, which is connected to a source of audio frequency current 37. Coil 36 may represent any suitable inductance coil connected to a source of A. F. such as the windings in the earphone 19, or it may represent an inductance coil in series with a crystal microphone, or an inductance coil connected to the output of an electric phonograph pickup. Coil 28 is preferably fixed in position, with coil 36 movable, although this condition may be reversed with coil 36 fixed and coil 28 movable, or in some instances both coils may be fixed in position.

Coil 28 may be concealed at any convenient point in a radio cabinet and various auxiliary devices containing a suitable inductance coil 36, may be brought into inductive relationship with coil 28, thus permitting these devices to operate through the audio frequency amplifier of the radio set, without the necessity of making any physical metallic connections between the auxiliary devices and the radio set.

A filter 38 is connected to inductance coil 28 through a switch 31. This may be a simple low-pass filter for the purpose of limiting feed-back, or it may consist of a suitably designed network of impedances, forming a bandpass filter.

Switching means 39 is shown interposed between the output of audio frequency amplifier 35 and translating device 40, which in this instance may be a conventional radio loud speaker. The actual arrangement of switching means 39 may be similar to that used in switch 34. In this case, the output of audio frequency amplifier 35 is connected to the arm of switch 39 and thence to the translating device or speaker 40, when switch is in the normal operating position. By moving the switch arm to other positions, speaker 40 may be disconnected from the circuit, and instead inductance coil 41 or distant speaker 42 may be connected at the output of the audio frequency amplifier 35. It is possible however, to eliminate or by-pass switching means 39 and connect translating device 40, inductance coil 41, and distant speaker 42, directly and permanently to the output of audio frequency amplifier 35.

Inductance coil 43, which may be movable or fixed, is placed in inductive relationship to inductance coil 41, which also may be movable or fixed. In this manner, audio frequency currents from the output of audio frequency amplifier 35 may be transmitted without electrical connections, inductively from coil 41 to coil 43 so that they may be used in translating device 44.

Filter 45 is connected to inductance coil 41 and serves the same general purpose as filter 38. As in the case of filter 38, the various impedances in the filter are designed to cooperate with the impedance of the inductance coil to which they are connected, in order to give the desired filtering effect. In other words, the impedance of coil 28 is actually a working component of filter 38 and the impedance of coil 41 is one of the working components of filter 45.

The source of current for the electronic tubes of radio set 11, is represented in the block diagram Fig. 3 by block 46. The source of the current may be alternating or direct current such as obtained from the ordinary houselighting circuit, or batteries may be used. If the source is alternating current, a current rectifying system including filtering means must be employed in order to supply D. C. voltage to the anodes of the vacuum tubes.

Switch means 48 is shown interposed between the current source 46 and the current rectifying system 47. In the form of the invention which omits the pre-audio section of the radio receiver and utilizes an audio frequency amplifier, switch means 48 may be a single-pole single-throw micro switch, normally in the open position, and closed by the weight of telephone handset 20, when the latter is put into a predetermined position, thus automatically energizing the audio frequency amplifier. Various conventional methods of heating the vacuum tubes rapidly are available, so that the amplifier will be in working operation a reasonably short time after the telephone handset closes the micro switch.

It is obvious that the flexible arrangement shown in Fig. 3 has many useful variations, combinations and applications. However, I do not limit my invention to the exact arrangements and combinations of the various devices and parts as described in the said specification, nor do I confine myself to the exact details of construction of said parts as set forth in the accompanying drawings, since it will be understood by those skilled in the art after understanding the invention, that various changes and further modifications may be made without departing from the spirit and scope of the invention, and it is intended therefore in the appended claims to cover all such changes and modifications.

What is claimed as new and desired to be secured by Letters Patent is:

1. A device of the character described, comprising in combination a radio receiver including a pre-audio section having an output and an audio frequency amplifier section having an input, inductance means, and electrical connections between said parts including change-over switch means, operable in one sense to disconnect said output of said pre-audio section from said input of said audio frequency amplifier section, and to connect said inductance means to said input of said audio frequency amplifier section, and operable in the opposite sense to disconnect said inductance means from said input of said audio frequency amplifier section and to reconnect said output of said pre-audio section to said input of said audio frequency amplifier section.

2. A device of the character described, comprising in combination a radio receiver including a pre-audio section and an audio frequency amplifier having an input and an output, a first inductance means, a first switch means, electrical connections from said first switch means to said pre-audio section, to said first inductance means and to said input, whereby said input is connected alternately to said pre-audio section and said first inductance means, depending upon the position of said first switch means, a second inductance means, a second switch means, a translating device, electrical connections from said second switch means to said translating device, to said output of said amplifier, and to said second inductance means, whereby said output is connected alternately to said translating device and said second inductance means, depending upon the position of said second switch means.

3. In combination a subscriber's telephone set including an earphone, an electronic audio frequency amplifier, inductance means, said inductance means electrically connected to said amplifier and inductively coupled to said earphone, an impedance network, said network electrically connected to and electrically cooperating with said inductance means, for reducing feedback and improving the quality of the telephone reception by filtering out undesirable frequencies and attenuating a portion of the frequencies causing distortion.

4. A device of the character described, comprising in combination an electronic audio frequency amplifier having an input and an output, inductance means, said inductance means electrically connected to said input, a loud speaker, said loud speaker electrically connected to said output, a grounded metallic shield, said shield partially enclosing said inductance means for preventing undesired electromagnetic reaction between said inductance means and said loud speaker.

5. A combined instrument for use either as a radio receiver or as an amplifier for incoming and outgoing telephone calls and comprising correlated radio and audio frequency sections, a translating device connected with the output of the audio frequency section for reproduction of either radio signals or telephone conversation, according to the use to which the instrument is being put, a support for a telephone handset, a telephone frequency inductive pickup positioned to be inductively coupled with the earphone of a telephone handset temporarily placed on said support, a feedback preventing filter connected with said telephone frequency inductive pickup, an acoustical amplifier positioned to pick up local sound and to directly conduct the same to the mouthpiece of a telephone handset on said support and electrical connections between said parts including change-over switch means operable in one sense to disconnect said radio frequency section from said audio frequency section and connect said telephone frequency inductive pickup and filter with the input of said audio frequency section to render, when the telephone handset is on the support, the audio frequency section and loud speaker effective for amplifying incoming telephone calls and the mouthpiece of the handset effective to pickup and transmit local sounds into outgoing telephone calls, and operable in the opposite sense to disconnect said telephone frequency inductive pickup and filter from said audio frequency section and re-connect the audio frequency section with the radio frequency section to restore the instrument to radio receiver operation and whereby said instrument may be utilized as a radio receiver and be at all times instantly convertible into use as a telephone amplifier and call pickup for incoming and outgoing telephone calls upon placing the telephone handset on said support and operating said switch means in the first sense, or be returned to use as a radio receiver upon removing the telephone handset from the support and operating said switch means in the second sense mentioned.

6. A combined instrument for use either as a radio receiver or as an amplifier for incoming and outgoing telephone calls and comprising correlated radio and audio frequency sections, a translating device connected with the output of the audio frequency section for reproduction of either radio signals or telephone conversation, according to the use to which the instrument is being put, a support for a telephone handset, a telephone frequency inductive pickup positioned to be inductively coupled with the earphone of a telephone handset temporarily placed on said support, a feedback preventing filter connected with said telephone frequency inductive pickup, an acoustical amplifier positioned to pick up local sound and to directly conduct the same to the mouthpiece of a telephone handset on said support and electrical connections between said parts including change-over switch means operable in one sense to disconnect said radio frequency section from said audio frequency section and connect said telephone frequency inductive pickup and filter with the input of said audio frequency section to render, when the telephone handset is on the support, the audio frequency section and loud speaker effective for amplifying incoming telephone calls and the mouthpiece of the handset effective to pick up and transmit local sounds into outgoing telephone calls, and operable in the opposite sense to disconnect said telephone frequency inductive pickup and filter from said audio frequency section and re-connect the audio frequency section with the radio frequency section to restore the instrument to radio receiver operation and whereby said instrument may be utilized as a radio receiver and be at all times instantly convertible into use as a telephone amplifier and call pickup for incoming and outgoing telephone calls upon placing the telephone handset on said support and operating said switch means in the first sense, or be returned to use as a radio receiver upon removing the telephone handset from the support and operating said switch means in the second sense mentioned, and said instrument further including a member movable by the placing of a telephone handset on said support to actuate said change-over switch means to automatically convert said instrument from radio reception to telephone amplification and transmission and to convert the instrument back to radio reception upon removal of the telephone handset from the support.

7. In a device of the character described, in combination, a radio receiver including an audio frequency amplifier having an output, inductance means, a translating device, and electrical connections between said parts including change-over switch means, operable in one sense to disconnect said translating device from said output of said audio frequency amplifier and connect said inductance means with the output of said amplifier, and operable in the opposite sense to disconnect said inductance means from said output of said amplifier and re-connect said translating device with said output of said amplifier.

8. A device of the character described, comprising in combination a radio receiver including a pre-audio section having an output, an audio frequency amplifier section having an input, an inductance coil, a single-pole double-throw switch having an arm and two contact points, electrical connections from said arm to said input of said audio frequency amplifier section, electrical connection from one point of said switch to said inductance coil, and an electrical connection from the other point of said switch to said output of said pre-audio section, whereby said input of said audio frequency amplifier section is connected alternately to said inductance coil and to said output of said pre-audio section, depending upon the position of said arm of said switch.

9. A combined instrument for use either as a radio receiver or as an amplifier for incoming and outgoing telephone calls and comprising correlated radio and audio frequency sections, a translating device connected with the output of the audio frequency section for reproduction of either radio signals or telephone conversations, according to the use to which the instrument is being put, a support for a telephone handset, a telephone frequency inductive pickup positioned to be inductively coupled with the earphone of a telephone handset temporarily placed on said support, feedback preventing means associated with staid telephone frequency inductive pickup and electrical connections between said parts including change-over switch means operable in one sense to disconnect said radio frequency section from said audio frequency section and connect said telephone frequency inductive pickup with input of said audio frequency section to render, when the telephone handset is on the support, the audio frequency section and translating device directly effective to amplify incoming telephone calls and together with the microphone of the handset, indirectly effective to amplify and transmit local sounds into outgoing telephone calls, and operable in the opposite sense to disconnect said telephone frequency inductive pickup from said audio frequency section and to re-connect the audio frequency section with the radio frequency section, to restore the instrument to radio receiver operation and whereby said instrument may be utilized as a radio receiver and be at all times instantly convertible into use as a telephone amplifier for incoming and outgoing telephone calls, upon placing telephone handset on said support and operating said switch means in the first sense, or to be returned to use as a radio receiver upon removing the telephone handset from the support and operating said switch means in the second sense mentioned.

10. In combination, a subscriber's telephone set including a first inductance means, an audio frequency amplifier, a second inductance means, said first inductance means electrically connected to said telephone set, said second inductance means electrically connected to said amplifier and inductively coupled to said first inductance means, impedance means, said impedance means electrically connected to and electrically cooperating with said second inductance means, for reducing feedback and improving the quality of the telephone reception by filtering out undesirable frequencies and attenuating a portion of the frequencies causing distortion.

11. A device as claimed in claim 10, said device further including a support for said telephone set, a timing device for progressively indicating the passage of time, switch means and a member movable by placing of said telephone set on said support, to actuate said switch means for automatically starting the operation of said timing device whenever said telephone set is placed on said support and for automatically stopping the operation of said timing device upon removal of said telephone set from said support.

12. A device as claimed in claim 10, said device further including a support for said telephone set, a counting device for registering the total number of telephone communications, and a member movable by placing said telephone set on said support for automatically actuating said counting device each time said telephone set is placed on said support.

13. In a device of the character described, in combination, a radio receiver including an audio frequency amplifier having an output, a first inductance means, a first translating device, a second inductance means, said second inductance means inductively coupled to and movable with respect to said first inductance means, a second translating device, said second translating device electrically connected to said second inductance means, electrical connections between said output of said audio frequency amplifier, and first inductance means and said first translating device including change-over switch means, operable in one sense to disconnect said first translating device from output of said amplifier and connect said first inductance means with the said output of said amplifier, and operable in the opposite sense to disconnect said first inductance means from said output of said amplifier and re-connect said first translating device with said output of said amplifier.

HARRY G. CISIN.

REFERENCES CITED

The following references are of record in the file of this patent:

UNITED STATES PATENTS

| Number | Name | Date |
|---|---|---|
| 1,484,973 | Stevenson | Feb. 26, 1924 |
| 1,973,081 | Keiser | Sept. 11, 1934 |
| 2,005,973 | Hellmann | June 25, 1935 |
| 2,079,089 | Varley | May 4, 1937 |
| 2,159,632 | Morey | May 23, 1939 |
| 2,160,829 | Cherry | Jan. 6, 1939 |
| 2,186,500 | Schnell | Jan. 9, 1939 |
| 2,214,992 | Chevassus | Sept. 17, 1940 |
| 2,268,665 | Loewe | Jan. 6, 1942 |
| 2,294,048 | Provenzano | Aug. 25, 1942 |

FOREIGN PATENTS

| Number | Country | Date |
|---|---|---|
| 461,626 | Great Britain | Aug. 19, 1935 |